(12) United States Patent
Isshiki et al.

(10) Patent No.: US 9,079,603 B2
(45) Date of Patent: Jul. 14, 2015

(54) MOTOR FOR AN ELECTRIC POWER STEERING APPARATUS

(75) Inventors: Yukitaka Isshiki, Chiyoda-ku (JP);
Yoshihito Asao, Chiyoda-ku (JP);
Masashi Hashimoto, Chiyoda-ku (JP);
Takehiro Kobayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1535 days.

(21) Appl. No.: 12/341,627

(22) Filed: Dec. 22, 2008

(65) Prior Publication Data
US 2010/0033044 A1    Feb. 11, 2010

(30) Foreign Application Priority Data

Aug. 8, 2008    (JP) .................................. 2008-205637

(51) Int. Cl.
| | |
|---|---|
| *H02K 3/50* | (2006.01) |
| *H02K 11/00* | (2006.01) |
| *B62D 5/04* | (2006.01) |
| *H02K 3/52* | (2006.01) |

(52) U.S. Cl.
CPC .............. *B62D 5/0403* (2013.01); *H02K 3/522* (2013.01)

(58) Field of Classification Search
CPC .............................. H02K 3/522; B62D 5/0403
USPC .................................................. 310/71, 179
See application file for complete search history.

(56) References Cited

U.S. PATENT DOCUMENTS

| | | | | |
|---|---|---|---|---|
| 6,600,244 | B2 * | 7/2003 | Okazaki et al. ................. | 310/71 |
| 6,737,772 | B2 * | 5/2004 | Tanaka et al. ................... | 310/71 |
| 6,924,570 | B2 * | 8/2005 | De Filippis et al. ............ | 310/71 |
| 6,936,942 | B1 | 8/2005 | Okazaki et al. | |
| 2003/0201688 | A1 | 10/2003 | Yamamura et al. | |
| 2005/0001494 | A1 * | 1/2005 | Kuribayashi et al. ........... | 310/71 |
| 2005/0179329 | A1 | 8/2005 | Okazaki et al. | |
| 2007/0076354 | A1 * | 4/2007 | Kato et al. ..................... | 361/637 |
| 2007/0205678 | A1 * | 9/2007 | Takashima et al. ............. | 310/71 |
| 2008/0150377 | A1 * | 6/2008 | Yamaguchi et al. ............ | 310/71 |

FOREIGN PATENT DOCUMENTS

| | | |
|---|---|---|
| DE | 10301441 A1 | 11/2003 |
| DE | 102004031605 A1 | 9/2005 |

(Continued)

OTHER PUBLICATIONS

Machine Translation of foreign document JP 11299159 A.*

*Primary Examiner* — Alex W Mok
(74) *Attorney, Agent, or Firm* — Sughrue Mion, PLLC; Richard C. Turner (57) ABSTRACT

A motor for an electric power steering apparatus is obtained which can reduce the number of parts required. The motor has terminals for electrically connecting between leads and a stator coil. Each terminal is a band-shaped conductive member that has a pair of connector side terminal end portions at its opposite ends, respectively, when developed, and a plurality of stator side terminal portions protruding to one side of the conductive member along a longitudinal direction thereof. Each terminal is deformed in its thickness direction into a circular shape, and the connector side terminal end portions being bent in the same plane are connected with each other to form a connector side terminal portion. The connector side terminal portion is connected to the leads, and the stator side terminal portions are connected to the stator coil.

7 Claims, 11 Drawing Sheets

(56) References Cited

FOREIGN PATENT DOCUMENTS

| | | |
|---|---|---|
| JP | 06-60965 U | 8/1994 |
| JP | 11-299159 A | 10/1999 |
| JP | 2003-324883 A | 11/2003 |
| JP | 3613262 B2 | 11/2004 |
| JP | 2005-229721 A | 8/2005 |
| JP | 2007-244008 A | 9/2007 |
| JP | 2008187875 A * | 8/2008 |

* cited by examiner

MOTOR FOR AN ELECTRIC POWER STEERING APPARATUS

BACKGROUND OF THE INVENTION

1. Field of the Invention

The present invention relates to a motor for an electric power steering apparatus that is provided with a terminal for electrically connecting between a lead for introducing an electric current from outside and a stator coil.

2. Description of the Related Art

In the past, there has been known a motor for an electric power steering apparatus which includes stator side terminals that have connecting portions, respectively, and are connected to a stator coil, connector side terminals that are connected to tip end portions of the connecting portions of the stator side terminals, respectively, a connector base that has a base portion with the connector side terminals formed on a surface thereof and female threaded portions formed in the base portion, leads that have at their one ends lead side terminals in contact with the connector side terminals, respectively, and serve to guide the electric current from the outside to the stator coil, and male threaded members that are threaded into the female threaded portions, respectively, for coupling the connector site terminals and the lead side terminals with each other (see, for example, a first patent document: Japanese patent application laid-open No. 2005-229721, paragraph 0014 and FIGS. 1 and 6).

In this motor, the connecting portions of the stator side terminals are inserted into corresponding insertion openings formed in the connector base, and the tip ends of the connection portions are joined with the connector side terminals by means of welding.

In such a known motor for an electric power steering apparatus, the connector side terminals and the stator side terminals are separate parts formed separately or independently of each other, thus resulting in an increase in number of parts required. In addition, in case where the stator coil has a three-phase Y-connection structure, there is a problem that when the connector side terminals and the stator side terminals are connected with each other, welding operations are required at three locations.

SUMMARY OF THE INVENTION

Accordingly, the present invention is intended to obviate the problems as referred to above, and has for its object to obtain a motor for an electric power steering apparatus in which the number of parts required can be reduced, and in which no soldering process or operation is needed in a process of electrically connecting a lead(s) with a stator coil.

Bearing the above object in mind, a motor for an electric power steering apparatus according to the present invention includes: a terminal that serves to electrically connect a lead for introducing an electric current from outside and a stator coil with each other; a holder that holds the terminal; and a connector base having a connector base main body on which a lead-side connector side terminal portion of the terminal is provided. The terminal is a band-shaped conductive member that has, at its opposite ends, connector side terminal end portions, respectively, when developed, and a plurality of stator side terminal portions protruding to one side of the band-shaped conductive member along a longitudinal direction thereof. The terminal is caused to deform in a thickness direction into a circular shape, and the connector side terminal end portions being bent in the same plane are connected with each other to form the connector side terminal portion. The connector side terminal portion is electrically connected to the lead, and the stator side terminal portions are electrically connected to the stator coil.

According to the motor for an electric power steering apparatus of the present invention, the terminal that serves to electrically connect the leads with the stator coil are formed of a single member, so the number of connecting parts required can be reduced, and soldering processes or operations can be made unnecessary in the process of electrically connecting the lead with the stator coil.

The above and other objects, features and advantages of the present invention will become more readily apparent to those skilled in the art from the following detailed description of preferred embodiments of the present invention taken in conjunction with the accompanying drawings.

DETAILED DESCRIPTION OF THE PREFERRED EMBODIMENTS

Now, preferred embodiments of the present invention will be described in detail while referring to the accompanying drawings. Throughout respective figures, the same or corresponding members or parts are identified by the same reference numerals and characters.

Embodiment 1

Figure 1:
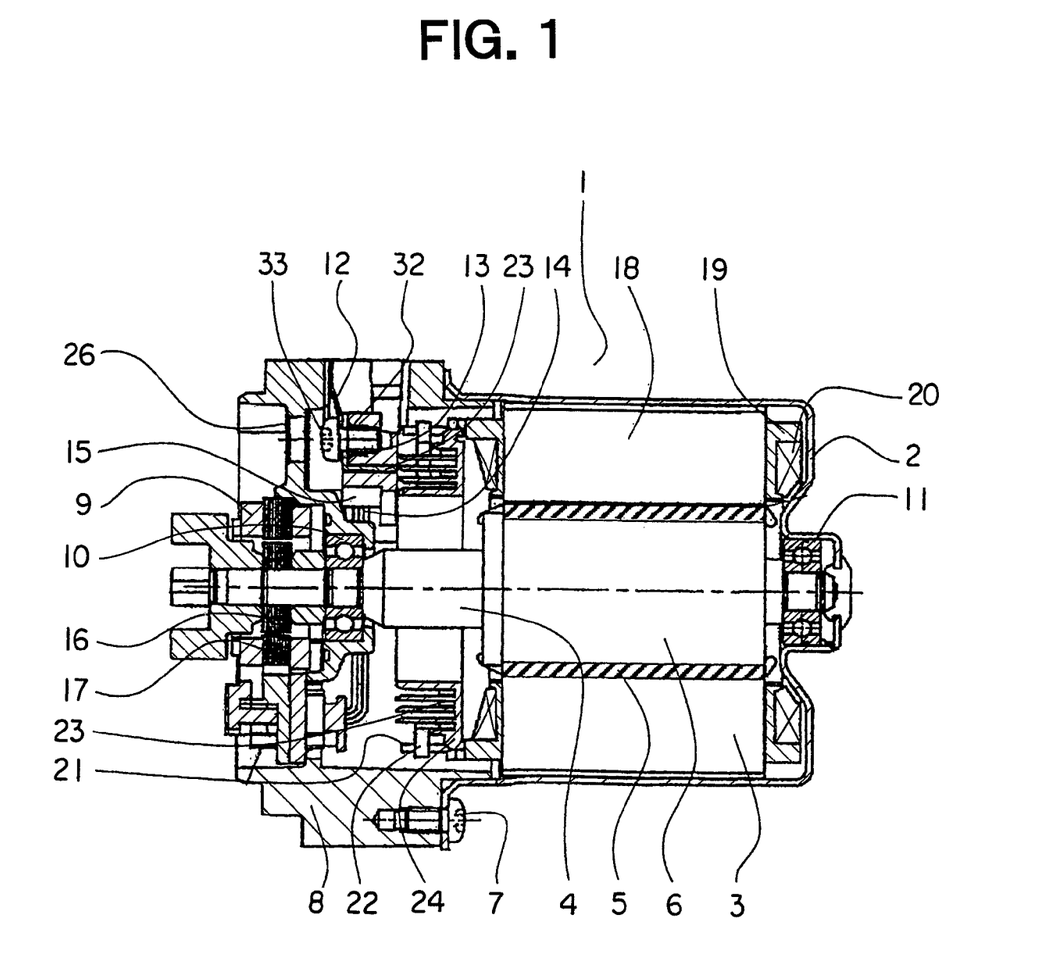
FIG. 1 is a cross sectional side elevational view showing a motor for an electric power steering apparatus according to a first embodiment of the present invention.
Figure 2:
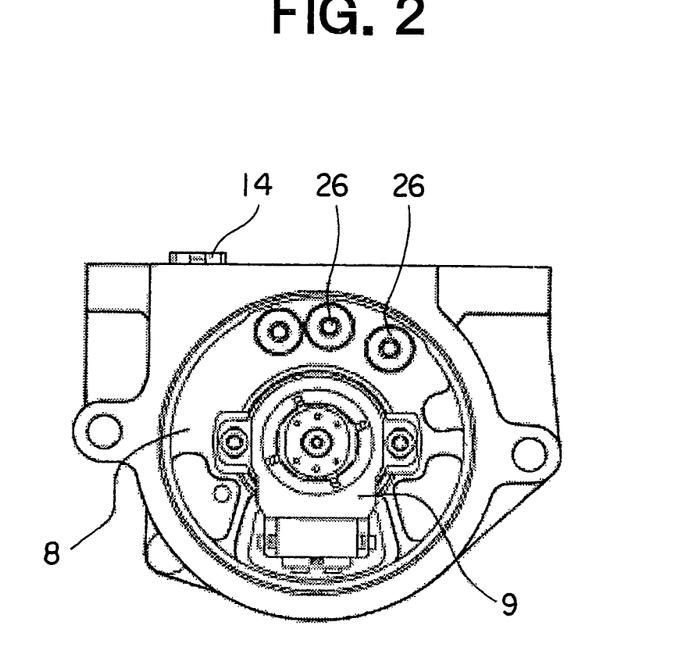
FIG. 2 is a front elevational view of the motor of FIG. 1.
Figure 3:
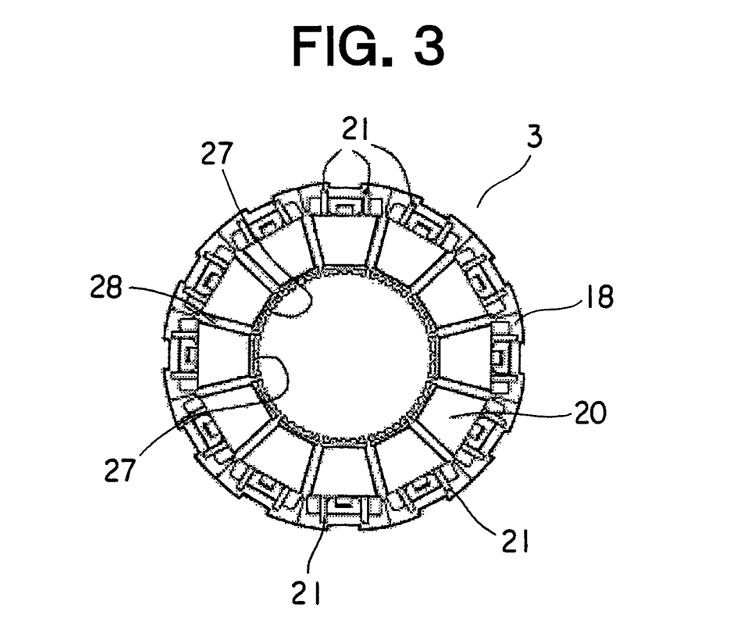
FIG. 3 is a front elevational view of a stator of FIG. 1.
Figure 4:
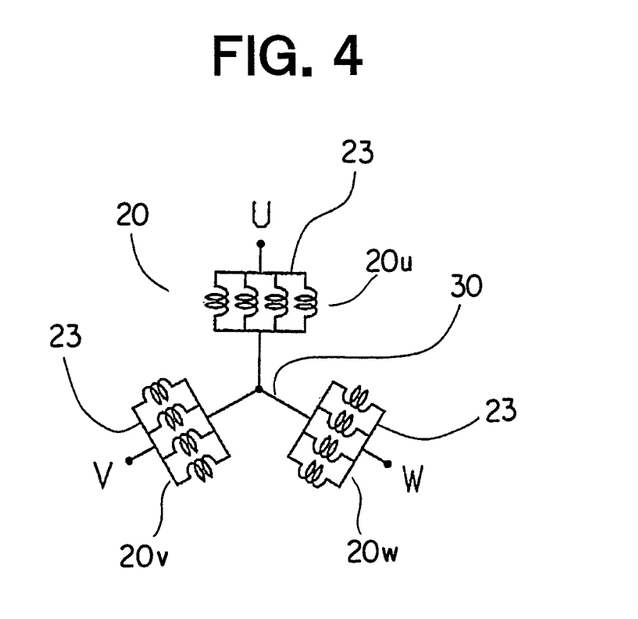
FIG. 4 is a connection diagram of a stator coil of FIG. 1.
Figure 5:
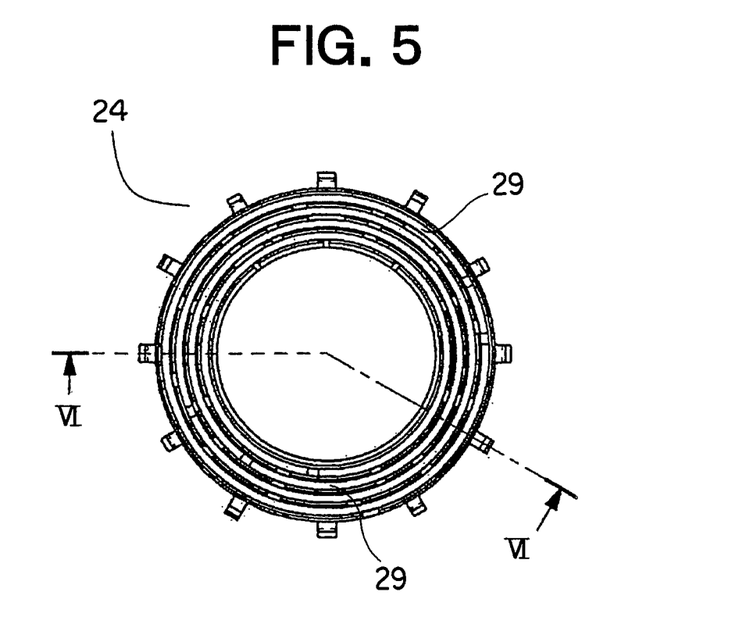
FIG. 5 is a front elevational view of a holder of FIG. 1.
Figure 6:
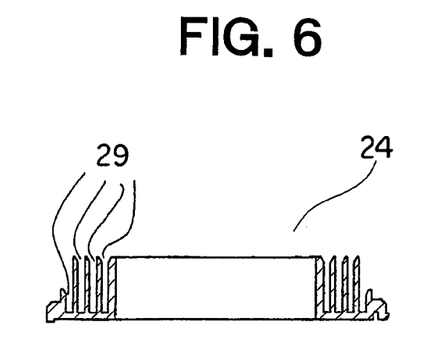
FIG. 6 is a cross sectional arrow view along line VI-VI in FIG. 5.

Referring to the drawings and first to FIG. 1, there is shown a motor for an electric power steering apparatus (hereinafter referred to as a motor) according to a first embodiment of the present invention. FIG. 1 is a cross sectional side view of the motor 1. FIG. 2 is a front elevational view of the motor 1 of FIG. 1. FIG. 3 is a front elevational view of a stator 3 of FIG. 1. FIG. 4 is a connection diagram of a stator coil 20 of FIG. 1. FIG. 5 is a front elevational view of a holder 24 of FIG. 1. FIG. 6 is a cross sectional arrow view along line VI-VI in FIG. 5.

The motor 1 includes a frame 2 of a bottomed cylindrical shape, a stator 3 that is fixedly secured to an inner peripheral wall surface of the frame 2, a shaft 4 that extends along a central axis of the frame 2, a rotor 6 that is composed of a cylindrical magnet 5 which is fixedly secured to the outer peripheral surface of the shaft 4 and has north (N) magnetic poles and south (S) magnetic poles, and a bracket 8 that is fixedly attached to a peripheral edge portion of the frame 2 by means of bolts 7.

Also, the motor 1 further includes a resolver-type rotation sensor that is fitted into the bracket 8, a bracket side bearing 10 that is fitted into the bracket 8 for rotatably supporting one end of the shaft 4, a frame side bearing 11 that is fixedly secured to a concave portion of a bottom of the frame 2 for rotatably supporting the other end of the shaft 4, a plurality of terminals 23 that are electrically connected to leads in the form of a bus bar 12 for introducing an electric current from outside, a holder 24 that serves to hold the terminals 23, a connector base 15 that is arranged at a location adjacent the holder 24, and a plurality of bundled sensor signal cables 14.

The rotation sensor 9 is provided with an elliptical rotor 16 that is fixedly mounted on the shaft 4, and a stator 21 that is arranged around an outer periphery of the rotor 16.

The bracket 8 has a plurality of work holes 26 formed therein through which the work of coupling the bus bar 12 and connector side terminal portions 13 at the ends of the terminals 23 is carried out by the use of the male threaded members such as bolts 33 from the outside. Here, note that the magnet 5 may comprise a plurality of arc magnets.

The stator 3 includes a stator core 18 that is composed of laminated magnetic steel sheets, a coil bobbin 19 that is made of resin or the like and is attached to the stator core 18, and a stator coil 20 that is wound around the stator core 18 and the coil bobbin 19 in an electrically insulated manner. The stator coil 20 is formed by winding an enamel covered copper wire having a wire diameter of about $\phi$ 1-2 for example around the stator core 18.

Figure 7:
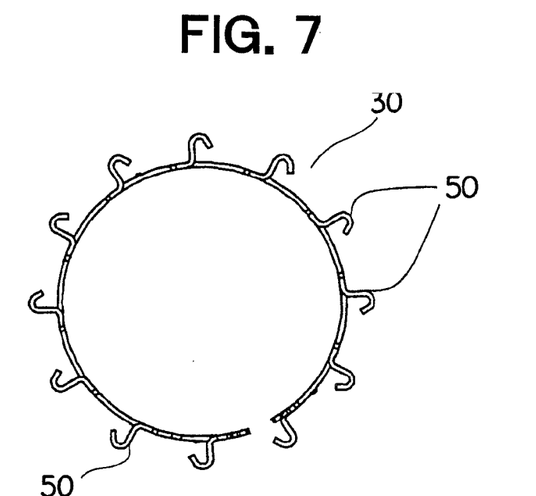
FIG. 7 is a front elevational view showing an in-phase conductive member of FIG. 4.

The stator coil 20 has 24 coil ends 21 which are three-phase, Y-connected with one another, i.e., 12 slots including three sets of four parallel-connected coils are Y-connected with one another, as shown in FIG. 4. Specifically, a U-phase coil portion 20u, a V-phase coil portion 20v and a W-phase coil portion 20w of the stator coil 20 have their one ends connected with one another through an in-phase conductive member 30, as shown in FIG. 7.

Figure 8:
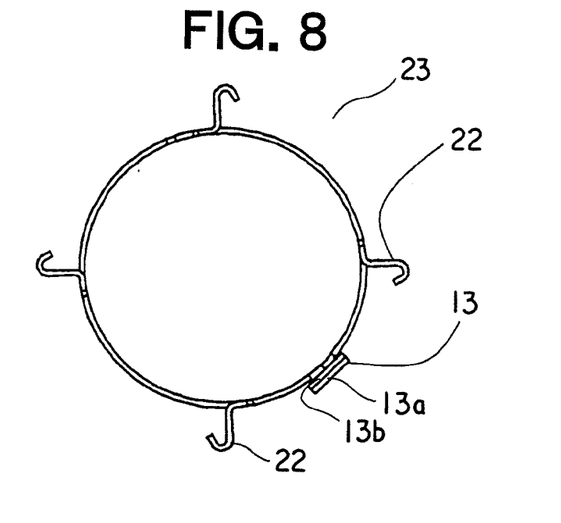
FIG. 8 is a front elevational view showing a terminal of FIG. 4 (before a connector side terminal portion is bent in a diametrically outer direction).

On the other hand, the U-phase coil portion 20u, the V-phase coil portion 20v and the W-phase coil portion 20w of the stator coil 20 have their other ends that form the individual terminals 23, respectively, which are separate phase conductive members, as shown in FIG. 8. The bus bar 12 and the stator coil 20 are electrically connected with each other through the terminals 23.

The coil ends 21 such as winding start ends and winding terminal ends of the stator coil 20 are connected with the stator side terminal portions 50 of the in-phase conductive member 30 and the stator side terminal portions 22 of the terminals 23.

Each of the terminals 23 is formed of a single member that has stator side terminal portions 22 and a connector side terminal portion 13. Each terminal 23 takes a band- or strip-shape, similar to the in-phase conductive member 30, when developed or expanded in a planar configuration, whereas it takes a circular shape when fitted in each groove 29 of the holder 24 made of an insulating material.

The stator core 18 has twelve slots 28 formed therein so as to extend in its axial direction at equal circumferential intervals with respect to one another. Also, the stator core 18 has twelve teeth 27 formed on its inner diameter side.

Figure 9:
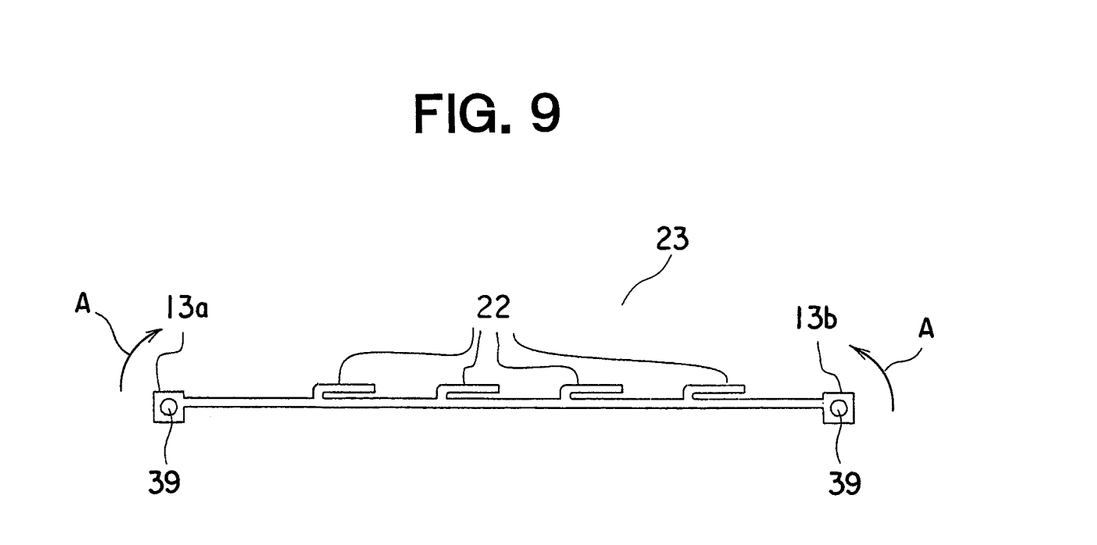
FIG. 9 is a development view showing the terminal of FIG. 8.

FIG. 9 is a development view of a terminal 23. The terminal 23 is a band- or strip-shaped conductive member in its developed or expanded state, and has, at its opposite enlarged ends or head portions, a pair of connector side terminal end portions 13a, 13b with holes 39 being formed therethrough, respectively. The terminal 23 has a plurality of (e.g., four) stator side terminal portions 22 formed on one of its longitudinally extending sides so as to protrude in its longitudinal direction.

Figure 10:
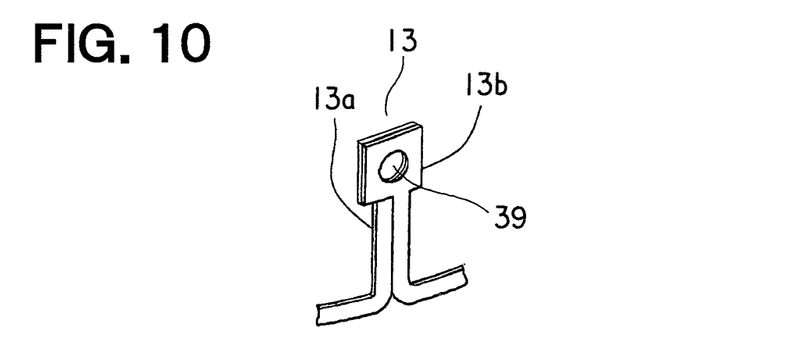
FIG. 10 is a perspective view of a connector side terminal portion of FIG. 9.
Figure 11:
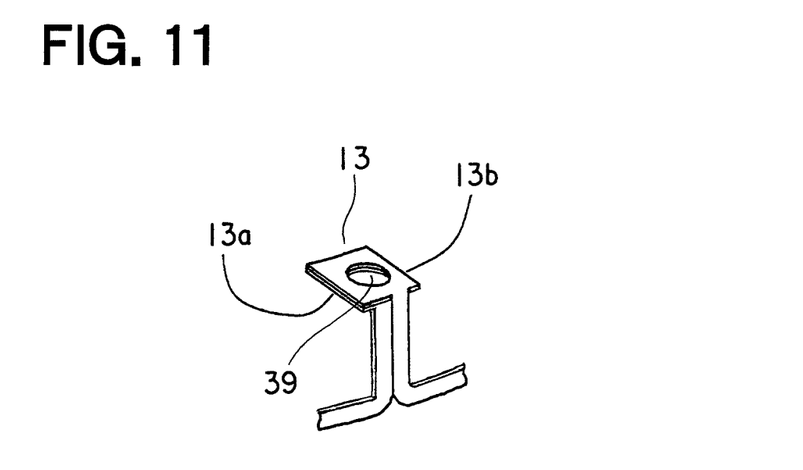
FIG. 11 is a perspective view of the connector side terminal portion of FIG. 10 after being bent.

The terminal 23 is forced to deform or curve in its thickness direction to form a circular shape, and the heads of the connector side terminal end portions 13a, 13b, which have been bent at right angles in the direction of arrow A in FIG. 9 in the same plane, are superposed with each other to form the connector side terminal portion 13, as shown in FIG. 10. The connector side terminal portion 13 thus formed is subsequently bent to a radially outer side in the thickness direction thereof, as shown in FIG. 11.

In addition, the stator side terminal portions 22 of the terminal 23 are also bent to the radially outer side in the thickness direction, and then the tip end portions of the stator side terminal portions 22 are each bent into a hook shape, as shown in FIG. 8.

Figure 12:
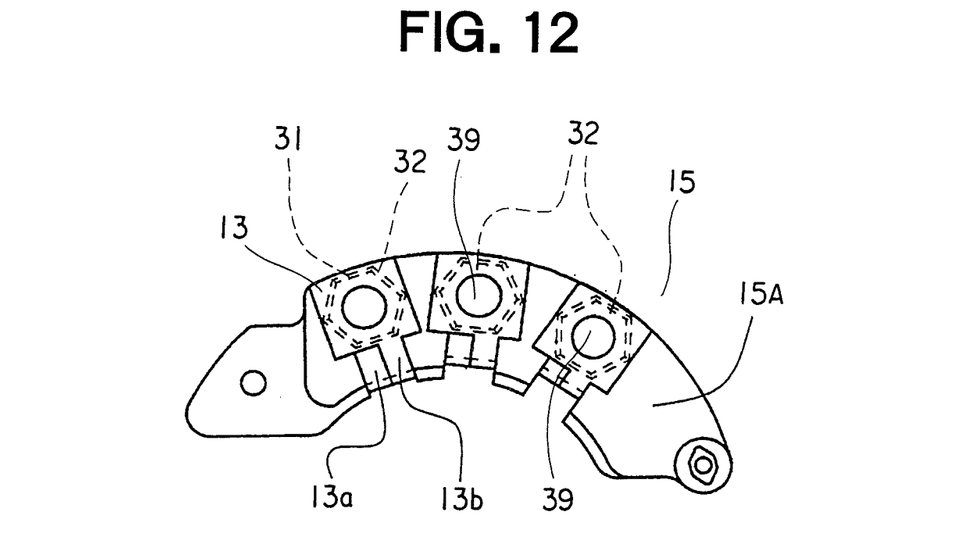
FIG. 12 is a front elevational view showing a connector base of FIG. 1.

FIG. 12 is a front elevational view showing the connector base 15. The connector base 15 has a connector base main body 15A with a plurality of (e.g., three) nut receiving holes 31 formed therein, and nuts 32 are inserted into the nut receiving holes 31, respectively, in the connector base main body 15A. The connector side terminal portions 13 of the terminals 23, at which the heads of the connector side terminal end portions 13a, 13b are superposed with each other, are placed on the individual nuts 32, respectively. Further, the bus bar 12 is placed in turn on the connector side terminal portions 13 thus placed on the connector side terminal end portions 13a, 13b, and is then coupled with the connector side terminal portions 13 by threading the bolts 33 (see FIG. 1) into the holes 39 in the connector side terminal portions 13 and into holes (not shown) formed in the bus bar 12.

Next, reference will be made to the operation of the motor 1 of the first embodiment as constructed in this manner.

An electric current is supplied to the connector side terminal portions 13 from an unillustrated power supply through the bus bar 12. Then, the electric current flows from the stator side terminal portions 22 of the terminals 23 to the stator coil 20 of the stator 3, so that a rotating field is generated around the rotor 16, thereby driving the shaft 4 to rotate. The electric power steering apparatus (not shown) operatively connected with the shaft 4 can be driven to operate in accordance with the rotational force of the shaft 4.

In addition, the magnetic field of the stator 17 is caused to fluctuate in accordance with the rotation of the rotor 16 of an elliptic shape, and the value of the fluctuation of the stator magnetic field is detected by the rotation sensor 9 and is output as a corresponding voltage through the sensor signal cables 14, so that the rotational angle of the shaft 4 is detected.

As described in the foregoing, according to the motor 1 of this first embodiment, the terminals 23 that serve to electrically connect the bus bar 12 with the stator coil 20 are each formed of a single member, so the number of parts of the motor 1 required can be reduced, and at the same time, a soldering process conventionally required for electrical connection between the bus bar 12 and the stator coil 20 can be eliminated.

Embodiment 2

Figure 13:
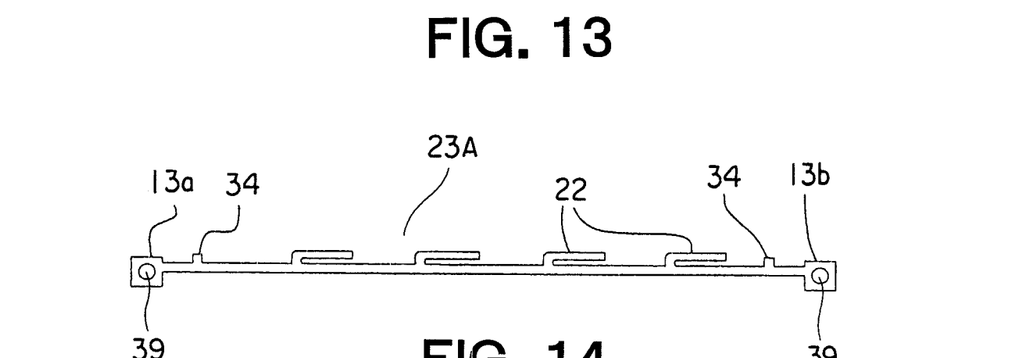
FIG. 13 is a development view showing a terminal in a motor for an electric power steering apparatus according to a second embodiment of the present invention.
Figure 14:
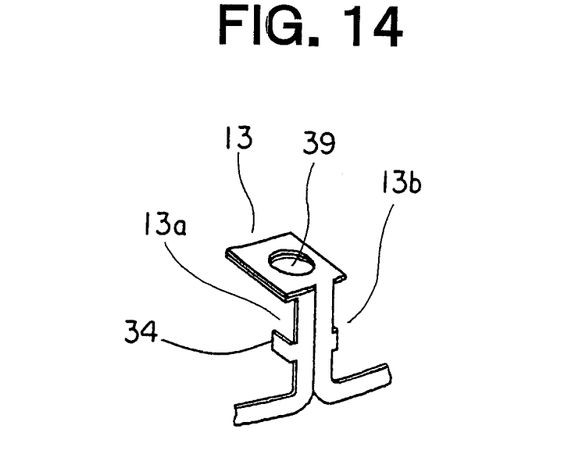
FIG. 14 is a perspective view of connector side terminal portion of FIG. 13.

FIG. 13 is a development view showing a terminal 23A in a motor 1 for an electric power steering apparatus according to a second embodiment of the present invention.

The terminal 23A, which is a band- or strip-shaped conductive member in its developed or expanded state, has a pair of protrusion portions 34 formed on connector side terminal end portions 13a, 13b, respectively, so as to protrude in the same direction as that in which stator side terminal portions 22 protrude. The protrusion portions 34 are bent at right angles in the thickness direction thereof, so that they can be inserted into insertion holes (not shown) formed in a connector base main body 15A (see FIG. 12).

The other construction of this second embodiment is similar to that of the first embodiment.

In the case of this terminal 23A, by the insertion of the protrusion portions 34 of the connector base 15 into the insertion holes in the connector base main body 15A, the terminal 23A is securely fixed to the connector base main body 15A.

In addition, the protrusion portions 34 are formed on the same side as the stator side terminal portions 22, and they are each formed within the range in which a long side of an adjacent L-shaped stator side terminal portion 22 is not exceeded, so the yield of the conductive member or the terminal 23A can not be reduced due to the formation of the protrusion portions 34 as compared with the above-mentioned first embodiment.

Embodiment 3

Figure 15:
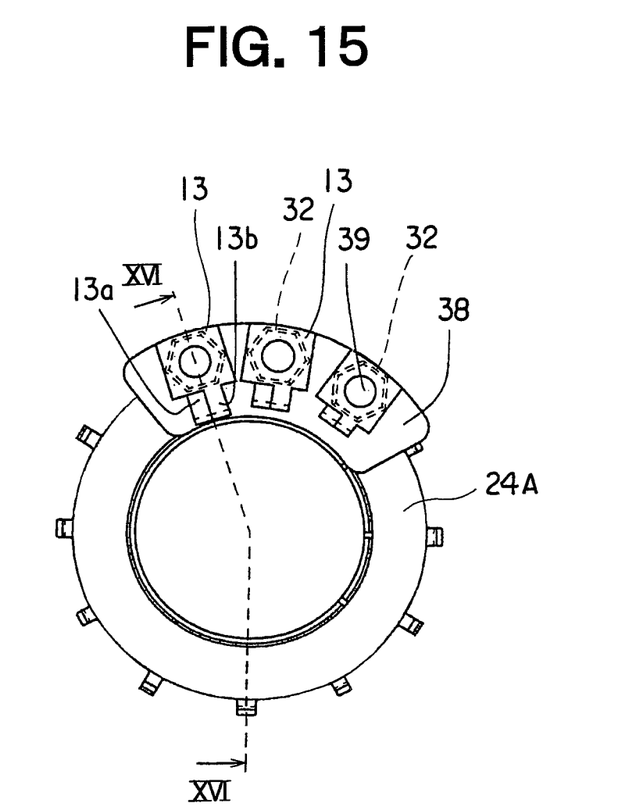
FIG. 15 is a front elevational view showing a connector base portion in a motor for an electric power steering apparatus according to a third embodiment of the present invention.
Figure 16:
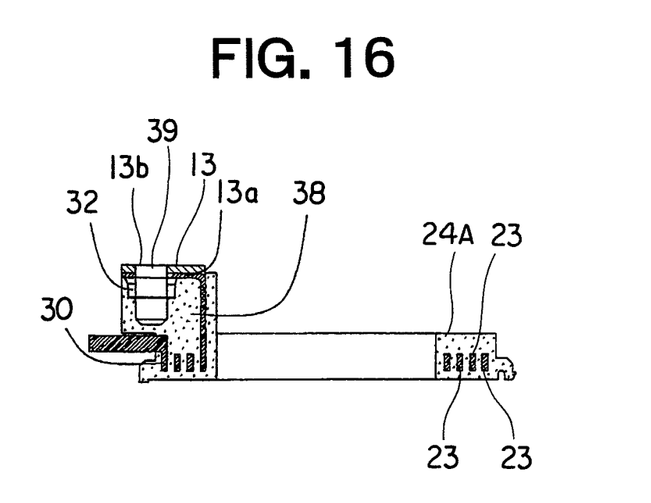
FIG. 16 is a cross sectional arrow view along line XVI-XVI in FIG. 15.

FIG. 15 is a front elevational view showing a connector base portion 38 in a motor 1 for an electric power steering apparatus according to a third embodiment of the present invention. FIG. 16 is a cross sectional arrow view along line XVI-XVI in FIG. 15.

This connector base portion 38 is formed integrally with a holder 24A, terminals 23 and an in-phase conductive member 30 by means of an insulating resin material. In this motor 1, similar to the above-mentioned first embodiment, a bus bar 12 is placed on connector side terminal portions 13 of the terminals 23, at which heads of connector side terminal end portions 13a, 13b thereof are superposed with each other, and then the bus bar 12 is coupled with the connector side terminal portions 13 by threading bolts 33 (see FIG. 1) into holes 39 in the connector side terminal portions 13 and into holes (not shown) formed in the bus bar 12.

The other construction of this third embodiment is similar to that of the first embodiment.

In a third embodiment of the present invention, the connector base portion 38 is formed integrally with the holder 24A, the terminals 23 and the in-phase conductive member 30, so these component parts can be handled as a single unit, thereby making it possible to decrease the number of assembling processes or steps as well as to reduce parts control.

Embodiment 4

Figure 17:
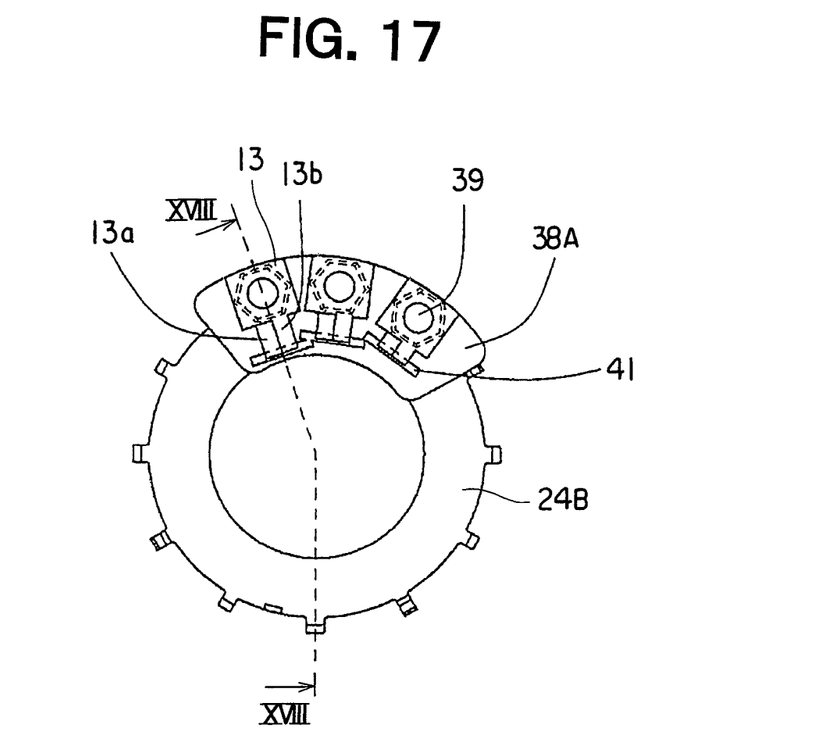
FIG. 17 is a front elevational view showing a connector base portion in a motor for an electric power steering apparatus according to a fourth embodiment of the present invention.
Figure 18:
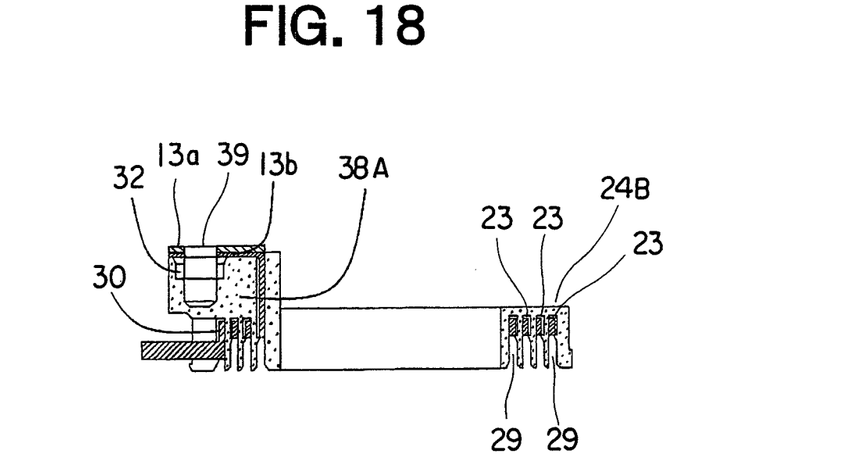
FIG. 18 is a cross sectional arrow view along line XVIII-XVIII in FIG. 17.

FIG. 17 is a front elevational view showing a connector base portion 38A in a motor 1 for an electric power steering apparatus according to a fourth embodiment of the present invention. FIG. 18 is a cross sectional arrow view along line XVIII-XVIII in FIG. 17.

In this motor 1, the connector base portion 38A is formed integrally with a holder 24B by means of an insulating resin material.

The holder 24B has a plurality of grooves 29 formed therein in which terminals 23 and an in-phase conductive member 30 are received. The terminals 23 have connector side terminal end portions 13a, 13b which are inserted from insertion holes 41 formed in the connector base portion 38A, and are then bent at right angles toward nuts 32, respectively.

The other construction of this fourth embodiment is similar to that of the first embodiment.

In this fourth embodiment of the present invention, it is not necessary to mold the holder 24B integrally with the in-phase conductive member 30 and the terminals 23, so the structure is simple.

Embodiment 5

Figure 19:
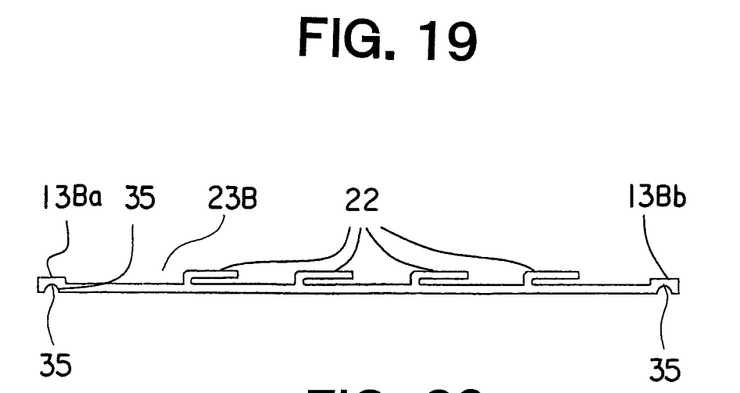
FIG. 19 is a development view showing a terminal in a motor for an electric power steering apparatus according to a fifth embodiment of the present invention.
Figure 20:
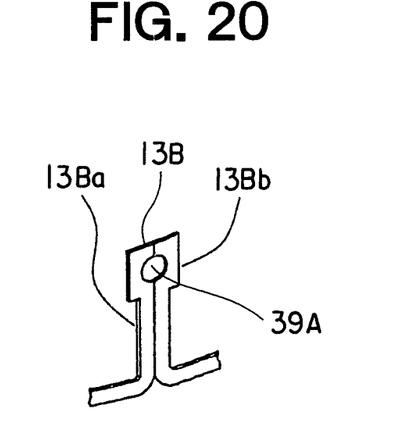
FIG. 20 is a perspective view of connector side terminal end portions of FIG. 19 before being bent.
Figure 21:
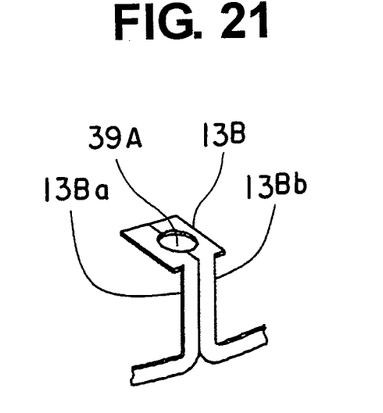
FIG. 21 is a perspective view of the connector side terminal end portions of FIG. 20 when being bent at right angles in their thickness direction.

FIG. 19 is a development view showing a terminal 23B in a motor 1 for an electric power steering apparatus according to a fifth embodiment of the present invention. FIG. 20 is a perspective view of connector side terminal end portions 13Ba, 13Bb at opposite ends of the terminal 23B. FIG. 21 is a perspective view of the connector side terminal end portions 13Ba, 13Bb when being bent at right angles in their thickness direction.

In this embodiment, the connector side terminal end portions 13Ba, 13Bb have semicircular notched portions 35 formed at their heads, respectively. The connector side terminal end portions 13Ba, 13Bb have their opposing end faces which are placed in abutment with each other to form a connector side terminal portion 13B having a hole 39A.

The other construction of this fifth embodiment is similar to that of the first embodiment.

The connector side terminal portion 13B of this fifth embodiment can be reduced in material by an amount of non-overlap of the heads of the connector side terminal end portions 13Ba, 13Bb in comparison with the connector side terminal portion 13 of the first embodiment which is formed by superposing or overlapping the heads of the connector side terminal end portions 13a, 13b with each other.

In addition, with the connector side terminal portion 13 of the first embodiment, it takes time and effort to align the central axes of the holes 39 of the superposed connector side terminal end portions 13a, 13b, and at the same time, it is not easy to insert a bolt 33 into the holes 39. However, in comparison with the first embodiment, according to this fifth embodiment, the end faces of the connector side terminal end portions 13Ba, 13Bb need only be made into abutment with each other so as to form the hole 39A, so the connection work of the connector side terminal end portions 13Ba, 13Bb becomes more efficient and convenient, and at the same time, a bolt 33 can be smoothly inserted into the hole 39A in an easy simple manner.

Moreover, the heads of the connector side terminal end portions 13Ba, 13Bb are formed to protrude to the same side as stator side terminal portions 22, and they are each formed within the range in which a long side of an adjacent L-shaped stator side terminal portion 22 is not exceeded, so the yield in a conductive member of the terminal 23B is better in comparison with the terminal 23 of the first embodiment.

Embodiment 6

Figure 22:
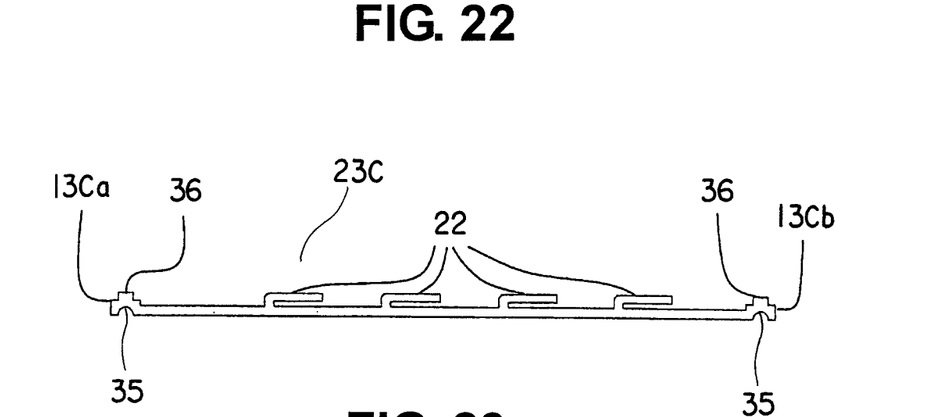
FIG. 22 is a development view showing a terminal in a motor for an electric power steering apparatus according to a sixth embodiment of the present invention.
Figure 23:
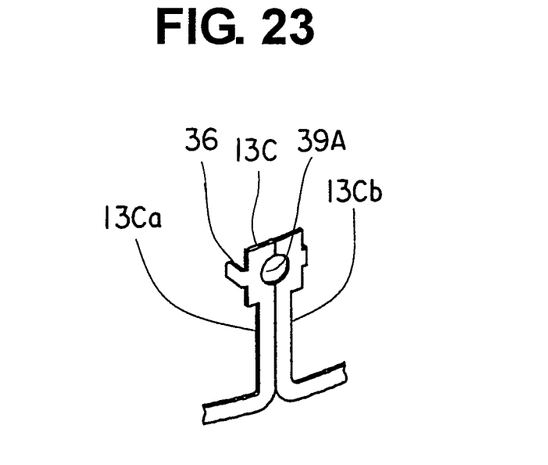
FIG. 23 is a perspective view of connector side terminal end portions of FIG. 22 before being bent.
Figure 24:
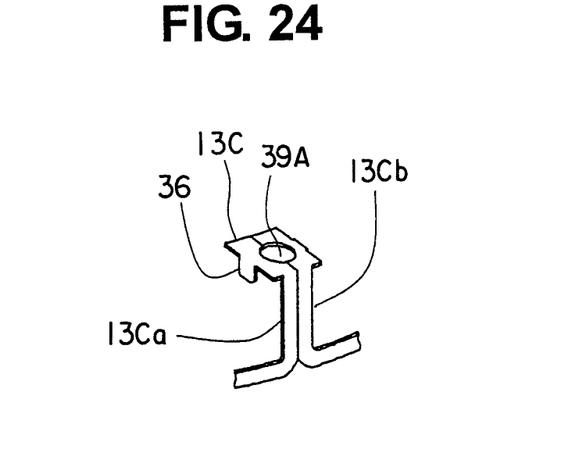
FIG. 24 is a perspective view of connector side terminal end portions of FIG. 23 when being bent at right angles in their thickness direction.

FIG. 22 is a development view showing a terminal 23C in a motor 1 for an electric power steering apparatus according to a sixth embodiment of the present invention. FIG. 23 is a perspective view of connector side terminal end portions 13Ca, 13Cb at opposite ends of the terminal 23C. FIG. 24 is a perspective view of the connector side terminal end portions 13Ca, 13Cb when being bent at right angles in their thickness direction.

In the terminal 23B of this sixth embodiment, each of the connector side terminal end portions 13Ca, 13Cb has a notched portion 35 and a protrusion portion 36 that are formed at opposite sides of its head, and the protrusion portion 36 protrudes to the opposite side of the notched portion 35. The protrusion portions 36 of the connector side terminal end portions 13Ca, 13Cb can be inserted into insertion holes (not shown) formed in a connector base main body 15A (see FIG. 12).

The other construction of this sixth embodiment is similar to that of the first embodiment.

In the terminal 23B of the above-mentioned fifth embodiment, there is a fear that a gap might be generated between the opposing end faces of the connector side terminal end portions 13Ba, 13Bb, as shown in FIG. 21.

In contrast to this, according to this sixth embodiment, the generation of such a gap can be prevented by inserting the protrusion portions 36 into the insertion holes in the connector base main body 15A.

Moreover, the protrusion portions 36 of the connector side terminal end portions 13Ba, 13Bb are formed to protrude to the same side as stator side terminal portions 22, and they are each formed within the range in which a long side of an adjacent L-shaped stator side terminal portion 22 is not exceeded, so it is possible to avoid a reduction in the yield of a conductive member of the terminal 23C due to the formation of the protrusion portions 36.

Embodiment 7

Figure 25:
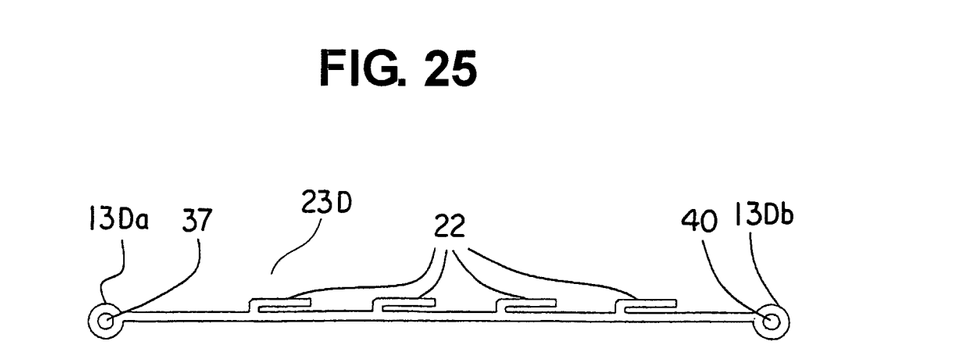
FIG. 25 is a development view showing a terminal in a motor for an electric power steering apparatus according to a seventh embodiment of the present invention.
Figure 26:
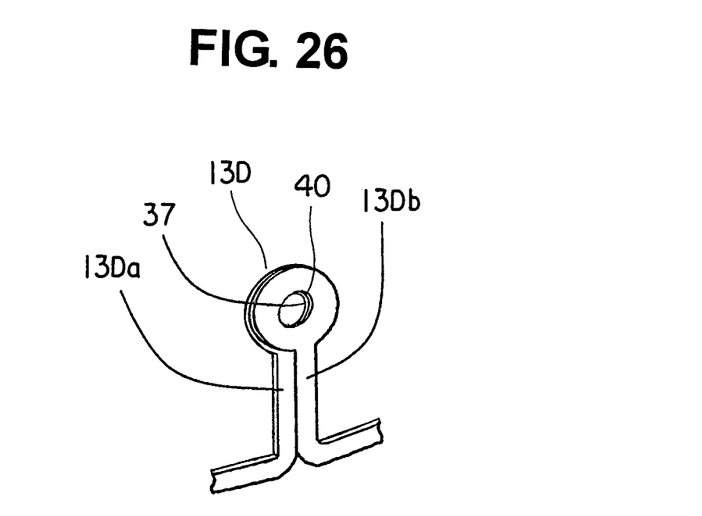
FIG. 26 is a perspective view of connector side terminal end portions of FIG. 25 before being bent.
Figure 27:
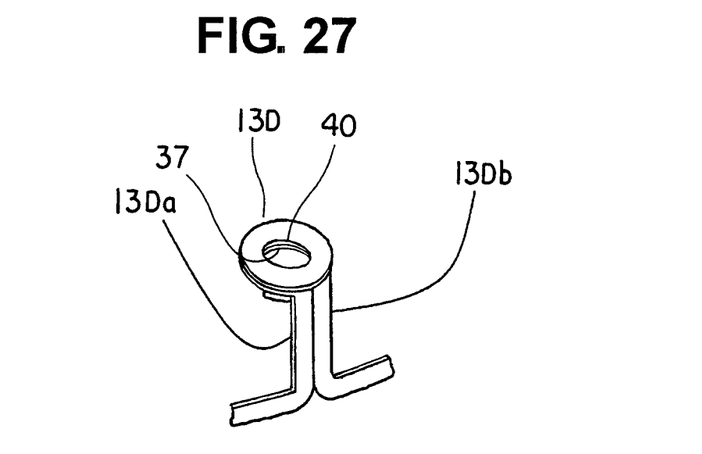
FIG. 27 is a perspective view of the connector side terminal end portions of FIG. 26 when being bent at right angles in their thickness direction.

FIG. 25 is a development view showing a terminal 23D in a motor 1 for an electric power steering apparatus according to a seventh embodiment of the present invention. FIG. 26 is a perspective view of connector side terminal end portions 13Da, 13Db at opposite ends of the terminal 23D. FIG. 27 is a perspective view of the connector side terminal end portions 13Da, 13Db when being bent at right angles in their thickness direction.

In the terminal 23D of this seventh embodiment, one 13Da of the connector side terminal end portions has a hole 37 formed in its head, and the hole 37 is subjected to burring processing and is threaded on its inner peripheral surface. The other connector side terminal end portion 13Db has a hole 40 formed in its head.

A connector side terminal portion 13D of the terminal 23D is formed by superimposing the head of the connector side terminal end portion 13Da and the head of the connector side terminal end portion 13Db with each other.

The other construction of this seventh embodiment is similar to that of the first embodiment.

In this seventh embodiment of the present invention, the inner peripheral surface of the hole 37 in the one connector side terminal end portion 13Da is threaded, so a nut 32 as required in the above-mentioned first embodiment becomes unnecessary, thus making it possible to reduce the number of parts required.

Here, note that in this seventh embodiment, too, the protrusion portions 34 in the above-mentioned second embodiment may be provided on the connector side terminal end portions 13Da, 13Db, respectively.

In addition, similar to the above-mentioned third embodiment, a plurality of terminals 23D can be formed integrally with a connector base portion 38, a holder 24A, and an in-phase conductive member 30 by means of an insulating resin material, as shown in FIG. 16.

Moreover, similar to the above-mentioned fourth embodiment, a plurality of terminals 23D can be held in grooves 29 of a holder 24B which is formed integrally with a connector base portion 38A by means of an insulating resin, as shown in FIG. 18.

Although in the above-mentioned respective embodiments, for fastening means or unit, the nuts 32 are used as the female threaded members and the bolts 33 are used as the male threaded members, the fastening means or unit is of course not limited to the nuts 32 and the bolts 33, but any other detachable fastening means or unit can be used.

In addition, although the bus bar is used as leads for introducing electric current, the present invention is not limited to such a bus bar, but anything can instead be used if it can be electrically connected to the terminals for introducing electric current from the outside.

Further, the shape of the heads of the connector side terminal end portions 13a, 13b, 13Da and 13Db is not limited to a quadrangle and a circle, but can be any other shape such as a triangle, a polygon, etc.

While the invention has been described in terms of preferred embodiments, those skilled in the art will recognize that the invention can be practiced with modifications within the spirit and scope of the appended claims.

What is claimed is:

1. A motor for an electric power steering apparatus comprising:
 a terminal that serves to electrically connect a lead for introducing an electric current from outside and a stator coil with each other;
 a holder that holds said terminal; and
 a connector base having a connector base main body on which a lead-side connector side terminal portion of said terminal is provided, said lead-side connector side terminal portion extending in an axial direction;

wherein said terminal is a single band-shaped conductive member that has, at its opposite ends, connector side terminal end portions, respectively, when developed in a planar configuration, and a plurality of stator side terminal portions protruding to one side of said band-shaped conductive member along a longitudinal direction thereof, wherein heads of said connector side terminal end portions protrude to said one side of said band-shaped conductive member;

said terminal is caused to deform in a thickness direction into a circular shape, and said connector side terminal end portions being bent in the same plane are connected with each other to form said connector side terminal portion; and said connector side terminal portion is electrically connected to said lead, and said stator side terminal portions are electrically connected to said stator coil.

2. The motor for an electric power steering apparatus as set forth in claim 1, wherein each of said connector side terminal end portions has a notched portion formed therein at a side opposite said stator side terminal portions, and said connector side terminal portion has a hole that is formed by surface-to-surface contact of end faces of said connector side terminal end portions in which said notched portions are formed.

3. The motor for an electric power steering apparatus as set forth in claim 2, wherein each of said connector side terminal end portions has a protrusion portion which is formed at a side opposite a corresponding one of said notched portions and which is adapted to be inserted into said connector base main body.

4. The motor for an electric power steering apparatus as set forth in claim 1, wherein said connector side terminal end portions have a pair of heads, respectively, a female threaded portion being formed in one of said heads on an inner peripheral surface thereof which has been subjected to burring processing, a hole being formed in the other of said heads, and said heads are superposed with each other to form said connector side terminal portion.

5. The motor for an electric power steering apparatus as set forth in claim 1, wherein each of said connector side terminal end portions has a protrusion portion adapted to be inserted into said connector base main body.

6. The motor for an electric power steering apparatus as set forth in claim 1, wherein said terminal, said holder and said connector base are integrally formed with one another by means of an insulating resin material.

7. The motor for an electric power steering apparatus as set forth in claim 1, wherein said holder and said connector base are integrally formed with each other by means of an insulating resin material.

* * * * *